United States Patent [19]

Fong et al.

[11] 4,022,950
[45] May 10, 1977

[54] REVERSIBLE PHOTOGALVANIC CELLS FOR THE CONVERSION OF SOLAR RADIATION INTO ELECTRICITY

[75] Inventors: Francis K. Fong; Nicholas Winograd, both of Lafayette, Ind.

[73] Assignee: Purdue Research Foundation, Lafayette, Ind.

[22] Filed: Jan. 14, 1976

[21] Appl. No.: 649,090

[52] U.S. Cl. .............................. 429/105; 429/111; 136/89 NB
[51] Int. Cl.$^2$ ........................................ H01M 6/30
[58] Field of Search .............. 136/89; 429/111, 105

[56] References Cited

OTHER PUBLICATIONS

C. W. Tang et al. "Photovoltaic Effects of Metal–Chlorophyll-$a$–Metal Sandwich Cells," J. Chem. Phys. 62, 2139–2149 (Mar. 1975).
C. W. Tang et al. "Transient Photovoltaic Effects in Metal–Chlorophyll-$a$–Metal Sandwich Cells," J. Chem. Phys. 63, 953–961 (July 1975).
Chem. Abstr. 79, 59943n (1973); 82, 14142c (1975).
V. B. Yevstigneyev et al. "Effect of Acidity of the Medium on the Photopotential and Change in pH on Interaction of Chlorophyll with Hydroquinone in Different Solvents," Biofizika, vol. 18, No. 1, pp. 53–58 (1973).
Y. M. Stolovitskii et al., "Photochemical and Photoelectronic Properties of the Components of the Photosynthetic Apparatus–I. Photogalvanic Effect with Constant Illumination of Films of Chlorophyll," Biofizika, vol. 19, No. 5, pp. 820–825 (1974).

Primary Examiner—T. Tung
Assistant Examiner—Aaron Weisstuch
Attorney, Agent, or Firm—John R. Nesbitt

[57] ABSTRACT

A device to convert solar energy into electricity, making use of the reversible photogalvanic principle. This principle is based on the spontaneous light and dark reactions between two electrochemical half cells constructed from a reversible electrochemical reaction. The device uses photosensitizers that operate in a broad band infrared spectral region.

The specific photosensitizer used is chlorophyll $a$ coated on a platinum electrode suspended in an ionic salt solution on one side of the cell and a platinum electrode is also suspended on the other side of the half cell in a hydroquinone solution, and the electrodes are electrically connected, these solutions are interconnected by a salt bridge which permits the flow of cation charge reversibly between said first and second half cells upon on-off light irradiation of the chlorophyll coated electrode.

14 Claims, 2 Drawing Figures

REVERSIBLE PHOTOGALVANIC CELLS FOR THE CONVERSION OF SOLAR RADIATION INTO ELECTRICITY

BACKGROUND OF THE INVENTION

There are a number of methods in existence for the direct conversion of solar energy into electricity. One example is solar conversion by semiconductors via the direct photoexcitation of electrons from the valence band to the conduction band. Typical semiconductors include Silicon and Germanium wafers. An extension of this method to organic molecules such as Chlorophyll has also been made although the yields reported have always been very low, as reported by C. W. Tang and A. C. Albrecht, *J. Chem. Phys.*, 63 953 (1975). Other semiconductors have been employed in electrochemical cells. By using $TiO_2$, Fujishima and Honda have successfully split water into $H_2$ and $O_2$ using blue light. Another known example is the conversion of photons to electricity by the photon induced potential changes at metal electrodes inserted in a homogeneous solution such as the mixture of $Fe^{2+}$ and thionine.

A basic difficulty with all the aforesaid devices and techniques is the low yield of energy out compared with the light energy put into the system. If solar energy is to be used at all, the conversion efficiency must be improved.

THE DRAWINGS

STATEMENT OF THE INVENTION

This invention makes use of a reversible photochemical reaction between two electrochemical half cells utilizing the relatively cheap organic chemical Chl *a* as the light responsive photosensitizer, a description of the Chl *a* molecule being set forth at p. 250 of F. K. Fong, *Theory of Molecular Relaxation* (Wiley Interscience, 1975). The relatively available chemical benzoquinone (Q) is the chemical used as an acceptor during the "light on" portion of the cell activity and as a donor during the "light off" portion of cell activity.

The device described in this disclosure is generally applicable to all reversible photochemical reactions.

The primary processes of the reversible photochemical reaction involving benzoquinone Q, hydroquinone $H_2Q$, chlorophyll Chl *a* and the Chl $a^+$ cation in different solvent systems has been the subject of numerous investigations, such as M. Tomkiewicz and M. P. Klein, *Proc. Nat. Acad. Sci. USA*, 70, 143 (1973).

Figure 1:
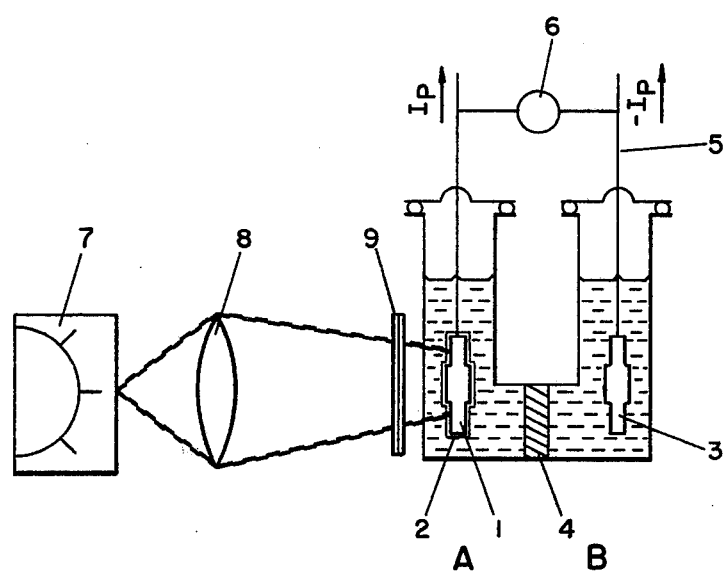
FIG. 1 is a schematic representation of a pair of electrogalvanic half cells with irradiation means impinging thereupon.

The photogalvanic cell is schematically represented in FIG. 1, in which a platinum electrode 1 is coated with Chl *a* 2 and suspended on one side of the cell denoted as "A" in a substantially neutral solution containing an ionic salt, such as $LiClO_4$, $LiNO_3$, KCl, LiCl, $NaNO_3$, or the like or some combination of two or more of said salts.

The other side of the half cell denoted as "B" has a platinum electrode suspended therein, in an aqueous solution of Q: $H_2Q$ (1:1) in a suitable buffer to maintain a pH of about 10.3. Methol Viologen has also been used in place of hydroquinone and has proved to be substantially pH independent. The half cells are separated by a suitable glass frit or salt bridge 4, selected to permit molecular migration as hereafter described.

The electrodes 1 and 3, which act alternately as an anode and a cathode, are electrically connected by conductor 5 through a suitable load 6. Means for irradiating the electrode 1 are provided by a light source 7 which may be focused through a lens 8 and a shutter 9 is provided to control the light/dark condition imposed on electrode 1.

The overall reaction may be written:

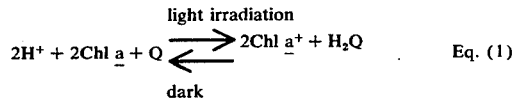

$$2H^+ + 2Chl\ \underline{a} + Q \underset{dark}{\overset{\text{light irradiation}}{\rightleftharpoons}} 2Chl\ \underline{a}^+ + H_2Q \qquad \text{Eq. (1)}$$

in which Chl *a* and $H_2Q$ act as the electron donor in the light and dark reactions, respectively.

The photogalvanic cell base on reaction (1) is given by

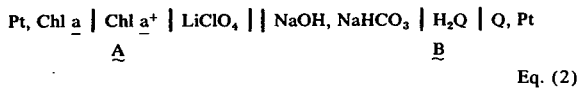

$$\text{Pt, Chl}\ \underline{a}\ |\ \text{Chl}\ \underline{a}^+\ |\ LiClO_4\ ||\ NaOH,\ NaHCO_3\ |\ H_2Q\ |\ Q,\ Pt$$
$$\underline{A} \qquad\qquad\qquad\qquad\qquad \underline{B}$$

Eq. (2)

In the presence of light, Chl *a* is oxidized to Chl $a^+$ at the anode (A) and Q is reduced to $H_2Q$ at the cathode (B) generating a photocurrent according to the forward reaction in (1). When the light is turned off, the back reaction in (1) results in a reverse current in (2) as the half cells regress toward the preillumination equilibrium in the absence of the photon field. In this case, $\underline{A}$ and $\underline{B}$ now act respectively as the cathode and the anode.

The Chl *a* may be extracted from spinach, or other natural source, and purified in the usual manner. About $3 \times 10^{14}$ Chl *a* molecules are deposited on a Pt electrode ( 0.2 $cm^2$ in area) by allowing 2$\mu$l of a $3 \times 10^{-4}$M solution of Chl *a* in butyronitrile, to evaporate on one side of the electrode. The Pt - Chl *a* electrode is then immersed in an o.1M aqueous solution of $LiClO_4$ in which the $Li^+$ ion is the ion charge carrier. The other half cell is a Chl *a*-free Pt electrode immersed in a $5 \times 10^{-3}$M aqueous solution of Q:$H_2Q$ (1:1) in a NaOH-$NaHCO_3$ buffer (pH = 10.3). All sample solutions were rigorously degassed through multiple freeze-pump-thaw cycles. The cell was assembled and sealed under an $N_2$ atmosphere in a dry box.

The photogalvanic cell of Formula (2) during open circuit cannot give rise to a photo-induced potential attributable to the reaction of Eq. (1) because electrons must be transferred in order to develop a potential change in the Chl *a* electrode. At pH = 10.3 the quinhydrone electrode has a reversible redox potential −0.12 V vs. SCE. The chlorophyll electrode is unpoised due to the absence of a defined quantity of Chl $a^+$.

Photogalvanic action is generated in the cell described under light irradiation producing photocurrent $I_p$. When the light is switched off, the reverse reaction in Eq. (1) induces a galvanic current opposite in sign to $I_p$. The on-off light cycle thus develops a reversible current whose magnitude is proportional to the intensity of the incident flux.

The spectral response of the observed photogalvanic effect was measured using a 100 W tungsten-halogen lamp as source 7 and a 0.25 m Jarrell-Ash monochromator was interposed between the source and the electrode. The results derived from a working embodiment built according to FIG. 1 are set forth in FIG. 2. The special distribution of the incident photon flux, F. in the 400 – 750 nm wavelength region was determined with a Spectrophysics 401B power meter. The monochromatic source had a maximum F value of $1.26 \times 10^{13}$ photon $sec^{-2}$ at 600 nm.

Figure 2:
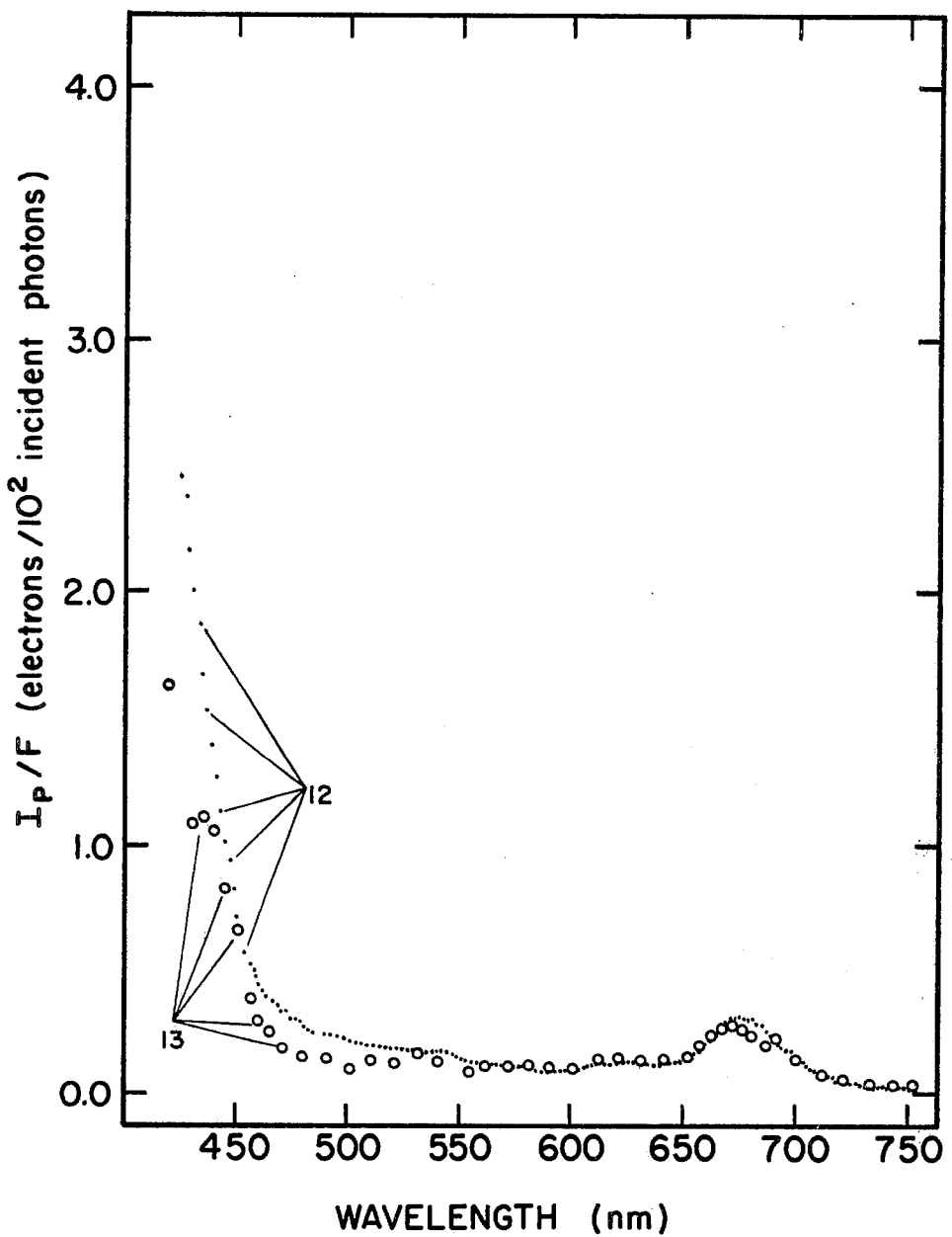
FIG. 2 is a graph depicting Ip/F readings vs. various light irradiation wavelengths.

The apparent quantum efficiencies $I_p/F$ (incident) range from about $2.3 \times 10^{-3}$ in the red wavelength region to about $1.1 \times 10^{-2}$ in the blue (See FIG. 2). However, the actual quantum efficiencies, given by the ratio of electrons released per photon absorbed, are about $2 \times 10^{-1}$ and $5 \times 10^{-1}$ in the red and blue wavelength regions, respectively. From reflectance measurements, it was estimated that about 1% of the incident flux was absorbed by the chlorophyll. The reflectance loss can be remedied by a thicker coat of Chl a on the Pt electrode.

The above described photogalvanic cell has made use of pure Chl in compartment A. FIG. 2 shows that the spectral region from about 450 nm to 650 nm is practically transparent. The points 12 describe experimental readings of $I_p/F$ when the cell B solution is Methyl Viologen. The points 13 describe readings when the cell B solution is hydroquinone. In order to capture solar radiation in this spectral window a number of suitable dyes can be employed to act as antenna molecules that transmit the absorbed photons in this spectral range to the Chl absorption band in the wavelength region 650 to 750 nm. Examples of these pigment molecules include the phycobyllisomes.

The cell described is reversible. Chl is one of the most abundant organic molecules that occurs in nature. The solar spectrum has a high energy cutoff at about 350 nm and extends deep into the infrared. (See dotted line in FIG. 2). The other cells described in the Background of the Invention section describe cells that operate at 580 nm. These cells have a theoretical limit of capturing a maximum of about 5% of the solar spectrum. The present solar cell described operates at wavelengths as long as 750 nm which means that about 55% of the solar spectrum can be utilized for direct conversion into electricity.

The present cell differs from existing photoelectrochemical cells in that it employs a galvanic cell in which power is derived from spontaneous chemical reaction between two half cells. In addition, this reaction proceeds by direct heterogeneous electron transfer from the excited Chl a molecule into the conduction band of the metal electrode rather than through the perturbation of homogeneous solution equilibrium which alters the Nernst electrode potential. The latter perturbation leads to photoelectrochemical effects that may be generically related to the Becquerel effect as described by E. Becquerel, *Compt. Rend.*, 9, 58, 561, 711 (1839).

The basic principles of the device illustrated and described by the specific example using Chl and Q or Methyl Viologen above can be extended to a variety of reversible spontaneous photochemical reactions. An obvious extension is the employment of bacteriochlorophyll a instead of Chl a. Bacteriochl a has the advantage of being photoelectrochemically active at about 900 nm. It may be necessary to modify the electron acceptor in this case due to the lower emf equivalence of the 900 nm photon. Specifically, for example, it can be replaced by ubiquinone which is known to be the primary electron acceptor in bacteriophotosynthesis. In fact, any reversible electron acceptor that can couple with the half cell in compartment A to generate a spontaneous photo-induced current is appropriate and within the scope of this invention.

We claim:
1. A photogalvanic cell comprised of:
 a first half cell having a first electrode suspended therein;
 a first solution contained in said first half cell with said solution comprising an ionic salt dissolved therein;
 a chlorophyll a coating on the electrode suspended in said first half cell;
 a second half cell having a second electrode suspended therein;
 a reversible electron acceptor solution contained in said second half cell;
 charge flow control means adapted to permit cation charge flow from one cell to the other between said first and second half cells with at least a portion of the respective solutions contained in said half cells being in contact with said flow control means whereby upon light irradiation of said first electrode and an electrical interconnection between said first and second electrodes, electrons flow therebetween and cation charge flows through said flow control means and whereby the absence of light causes a reversal of electron flow between the electrode and of cation charge flow through said flow control means.

2. The photogalvanic cell according to claim 1 in which said first solution is an aqueous solution of an ionic salt.

3. The photogalvanic cell according to claim 2 in which said first solution has a substantially neutral pH.

4. The photogalvanic cell according to claim 2 in which said ionic salt is selected from the group consisting of $LiClO_4$, $LiNO_3$, KCl, LiCl, and $NaNO_3$.

5. The photogalvanic cell according to claim 4 in which said ionic salt includes at least two of said described salts.

6. The photogalvanic cell according to claim 1 in which said reversible electron acceptor solution is comprised of hydroquinone.

7. The photogalvanic cell according to claim 6 in which said reversible electron acceptor solution has a pH of about 10.3.

8. The photogalvanic cell according to claim 1 in which said reversible electron acceptor solution is comprised of Methyl Viologen.

9. The photogalvanic cell according to claim 8 in which said first solution contained in said first half cell has a pH of about 7.

10. The photogalvanic cell according to claim 8 in which said first electrode is platinum.

11. The photogalvanic cell according to claim 1 in which said second electrode is platinum.

12. A photogalvanic cell comprised of:
 a first half cell having a chlorophyll a-coated platinum electrode suspended therein;
 a solution contained in said first half cell comprising an ionic salt dissolved therein;
 a second half cell having a platinum electrode suspended therein;
 a hydroquinone solution contained in said second half cell;
 a salt bridge sized and located to permit the flow of cation charge reversibly between said first and second half cells upon on-off light irradiation of said first electrode and the electrical interconnection of said first and second electrodes.

13. A photogalvanic cell, comprising:
a first half cell having a first electrode;
a chlorophyll *a* coating on said first electrode;
said first electrode being immersed in a first solution comprising an ionic salt dissolved therein;
a second half cell having a second electrode, said second electrode beng immersed in a reversible electron acceptor solution;
said first and second electrodes being spaced from one another; and
means including charge flow control means between and in contact with said solutions whereby light irradiation of said first electrode causes charge flow between said electrodes when said electrodes are electrically interconnected by means external of said cell with cation charge flowing in one predetermined direction between said electrodes through said charge flow control means, and whereby in the absence of light a reversal of charge flow is caused with cation charge flowing in the opposite direction from said one predetermined direction between said electrodes.

14. The photogalvanic cell according to claim 13 wherein said charge flow control means is a salt bridge sized to permit said cation charge flow.

* * * * *